United States Patent
Ohchi et al.

(10) Patent No.: US 8,333,578 B2
(45) Date of Patent: Dec. 18, 2012

(54) CENTER MECHANISM OF TIRE VULCANIZER

(75) Inventors: Ryota Ohchi, Takasago (JP); Yasuhiko Fujieda, Takasago (JP); Yuichiro Mizuta, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 13/304,490

(22) Filed: Nov. 25, 2011

(65) Prior Publication Data

US 2012/0156317 A1    Jun. 21, 2012

(30) Foreign Application Priority Data

Dec. 21, 2010    (JP) ................................. 2010-284822

(51) Int. Cl.
B29C 35/02 (2006.01)

(52) U.S. Cl. .......................................... 425/48; 425/58

(58) Field of Classification Search ............. 425/48, 425/52, 58
See application file for complete search history.

(56) References Cited

U.S. PATENT DOCUMENTS

| | | | | |
|---|---|---|---|---|
| 3,396,221 A | * | 8/1968 | Balle et al. ...................... | 425/52 |
| 3,794,457 A | | 2/1974 | Gazuit | |
| 4,597,729 A | * | 7/1986 | Singh et al. ...................... | 425/38 |
| 4,608,219 A | * | 8/1986 | Singh et al. ...................... | 425/43 |
| 4,670,209 A | * | 6/1987 | Nakagawa et al. .............. | 425/48 |
| 4,846,649 A | * | 7/1989 | Hasegawa et al. ............... | 425/58 |
| 4,871,305 A | * | 10/1989 | Galigani ........................ | 425/35 |
| 4,950,141 A | * | 8/1990 | Maikuma et al. ............... | 425/48 |
| 5,106,280 A | | 4/1992 | Sakaguchi | |
| 6,343,917 B1 | | 2/2002 | Mitamura | |
| 2009/0139659 A1 | | 6/2009 | Fujieda et al. | |

FOREIGN PATENT DOCUMENTS

| | | |
|---|---|---|
| DE | 40 24 435 A1 | 2/1991 |
| EP | 1 075 927 A2 | 2/2001 |
| EP | 1 075 927 A3 | 2/2001 |
| JP | 51-17282 | 2/1976 |
| JP | 56-166040 | 12/1981 |
| JP | 57-39942 | 3/1982 |

OTHER PUBLICATIONS

Extended European Search Report issued Apr. 2, 2012, in European Patent Application No. 11191523.7.

* cited by examiner

*Primary Examiner* — James Mackey
(74) *Attorney, Agent, or Firm* — Oblon, Spivak, McClelland, Maier & Neustadt, L.L.P.

(57) ABSTRACT

In a center mechanism of a tire vulcanizer of the present invention, in order to improve working efficiency and lower total height, after a green tire is vulcanized and patterned and becomes a vulcanized tire, a bladder well is lifted from a bottom position where a lower bead ring is positioned on a lower mold and a bladder is installed in the green tire to a top position where the lower bead ring is positioned above the lower mold and an upper clamp, and the upper clamp, a lower clamp, and the bladder are placed in the bladder well, while heights of the upper clamp and the lower clamp are fixed.

3 Claims, 3 Drawing Sheets ent mechanism of a tire vulcanizer for expanding a bladder to let the bladder closely contacted with the inner circumferential surface of a green tire.

CENTER MECHANISM OF TIRE VULCANIZER

BACKGROUND OF THE INVENTION

1. Field of the Invention

The present invention relates to a center mechanism of a tire vulcanizer for expanding a bladder to let the bladder closely contacted with the inner circumferential surface of a green tire.

2. Description of the Related Art

In general, in a tire vulcanizer, before vulcanization and patterning of a green tire is performed in a space formed by an upper mold and a lower mold that are clamped, a center mechanism performs shaping, in which a bladder is expanded to be closely contacted with the inner circumferential surface of the green tire, or the like.

Japanese Unexamined Patent Application Publication No. S57(1982)-39942 discloses a center mechanism of a tire vulcanizer, in which the shaping is performed in such a manner that, when a green tire is loaded on a lower mold, a bladder is vertically extended so that the bladder is positioned in a center space of the green tire, and after the green tire is loaded, the bladder is vertically retracted and laterally expanded, so that the bladder is closely contacted with the inner circumferential surface of the green tire.

In this center mechanism of a tire vulcanizer, however, there is a need for lifting an upper mold to above the vertically extended bladder. Thus, it takes a time for the upward and downward movement of the upper mold, a dry cycle time is elongated, and the total height of the tire vulcanizer is increased. In addition, in order to take the bladder away from the green tire after the vulcanization is completed, there is also a need for separately providing a vacuum line for suctioning heat medium in the bladder and retracting the bladder. Thus, the structure of the center mechanism is complicated.

Accordingly, Japanese Unexamined Patent Application Publication No. S51(1976)-17282 discloses a tire vulcanization press device, in which the shaping is performed in such a manner that, when a green tire is loaded on a lower mold, a bladder is placed in a bladder well provided under the lower mold, and after the green tire is loaded, the bladder is inserted into the interior of the green tire and expanded, so that the bladder is closely contacted with the inner circumferential surface of the green tire.

In this tire vulcanization press device, since the bladder is placed in the bladder well, there is no need for a vacuum line for taking the bladder away from the green tire, and the lifting amount of an upper mold can be suppressed. Thus, the total height of a tire vulcanizer is not increased, and hence a dry cycle time can be shortened.

According to the tire vulcanization press device of Japanese Unexamined Patent Application Publication No. S51 (1976)-17282, however, the tire is unloaded from the lower mold in such a manner that an upper bead portion of the vulcanized and patterned tire is held between a chuck and a bead ring of the upper mold, and then the upper mold together with the chuck is lifted, while the bladder is taken away from the inner circumferential surface of the tire by lowering each of upper and lower clamps that clamp an upper end portion and a lower end portion of the bladder. That is, the unloading of the tire from the lower mold and the taking of the bladder away from the inner circumferential surface of the tire are performed by separate operations, and working efficiency is not favorable.

In addition, in this tire vulcanization press device, when the bladder is placed, there is a need for vertically arranging cylinders for lifting/lowering the upper and lower clamps below the lower mold so as to lower each of the upper and lower clamps. Further, if these cylinders can not be contained between the lower mold and a base ground, there is a need for digging a pit, in which the cylinders are placed, in the base ground. In this way, when the lowering amounts of the upper and lower clamps are large, the total height of the tire vulcanizer is increased.

SUMMARY OF THE INVENTION

An object of the present invention is to provide a center mechanism of a tire vulcanizer capable of improving working efficiency and lowering total height.

A center mechanism of a tire vulcanizer of the present invention is a center mechanism of a tire vulcanizer, in which a green tire is vulcanized and patterned in such a manner that a bladder is installed in the green tire, and then the green tire is squeezed between a lower mold provided on a base frame and a upper mold, which is positioned above the lower mold and openable and closeable relative to the lower mold, the center mechanism including: an upper clamp for holding an upper end portion of the bladder; a lower clamp positioned under the upper clamp, the lower clamp for holding a lower end portion of the bladder; a lower bead ring supporting a lower bead of the green tire from below; an upper clamp lifting/lowering mechanism for upwardly and downwardly moving the upper clamp; a lower clamp lifting/lowering mechanism for upwardly and downwardly moving the lower clamp; a bladder well with an upper end thereof being connected to the lower bead ring, the bladder well being capable of placing the upper clamp, the lower clamp, and the bladder inside thereof; and a bladder well lifting/lowering mechanism for upwardly and downwardly moving the bladder well within a range between a bottom position where the lower bead ring is positioned on the lower mold and the bladder is installed in the green tire and a top position where the lower bead ring is positioned above the lower mold and the upper clamp, and the upper clamp, the lower clamp, and the bladder are placed in the bladder well, wherein after the green tire is vulcanized and patterned, the bladder well lifting/lowering mechanism lifts the bladder well from the bottom position to the top position while heights of the upper clamp and the lower clamp are fixed.

According to the above structure, after the green tire is vulcanized and patterned, the bladder well is lifted from the bottom position to the top position while the heights of the upper clamp and the lower clamp are fixed. Thereby, the vulcanized and patterned tire with the lower bead being supported by the lower bead ring is lifted. Thus, the tire is unloaded from the lower mold and at the same time, the bladder is placed in the bladder well. In this way, the unloading of the tire from the lower mold and the taking of the bladder away from the inner circumferential surface of the tire can be performed by one operation. Thus, the working efficiency can be improved. In addition, when the bladder is placed in the bladder well, there is no need for lowering the heights of the upper clamp and the lower clamp. Thus, lowering amounts of the upper clamp and the lower clamp can be suppressed, and hence the total height of the tire vulcanizer can be decreased.

In the center mechanism of a tire vulcanizer of the present invention, the lower clamp lifting/lowering mechanism may have a cylinder member including a male screw on an outer circumference thereof, and supporting the lower clamp from below, an adjustment nut to be screwed onto the male screw of the cylinder member, and a motor fixed to the base frame, the motor for rotating the adjustment nut.

When vulcanization and patterning are started, downward force due to vulcanization internal pressure acts on the lower clamp. According to the above structure, however, this force is received by the base frame through the adjustment nut. Thereby, the lower clamp can be prevented from being pushed down. In addition, unlike conventional cylinders that are vertically arranged, the motor can be arranged lateral to the adjustment nut. Thus, in comparison to a case where the cylinders are used, the length of the tire vulcanizer below the lower mold can be vertically shortened.

In the center mechanism of a tire vulcanizer of the present invention, the upper clamp lifting/lowering mechanism may have a hollow rod including a female screw on an inner circumference thereof, and supporting the upper clamp from below, a screw shaft arranged within the rod to be screwed into the female screw, and a motor fixed to the base frame, the motor for rotating the screw shaft.

According to the above structure, unlike the conventional cylinders that are vertically arranged, the motor can be arranged lateral to the screw shaft. Thus, in comparison to a case where the cylinders are used, the length of the tire vulcanizer below the lower mold can be vertically shortened.

In the center mechanism of a tire vulcanizer of the present invention, the bladder well lifting/lowering mechanism may be a pneumatic cylinder.

According to the above structure, by using the pneumatic cylinder, a maintenance property regarding leakage can be improved in comparison to a hydraulic cylinder.

DESCRIPTION OF THE PREFERRED EMBODIMENTS

Hereinafter, a preferred embodiment of the present invention will be described with reference to the drawings.
(Structure of Center Mechanism of Tire Vulcanizer)

Figure 1:
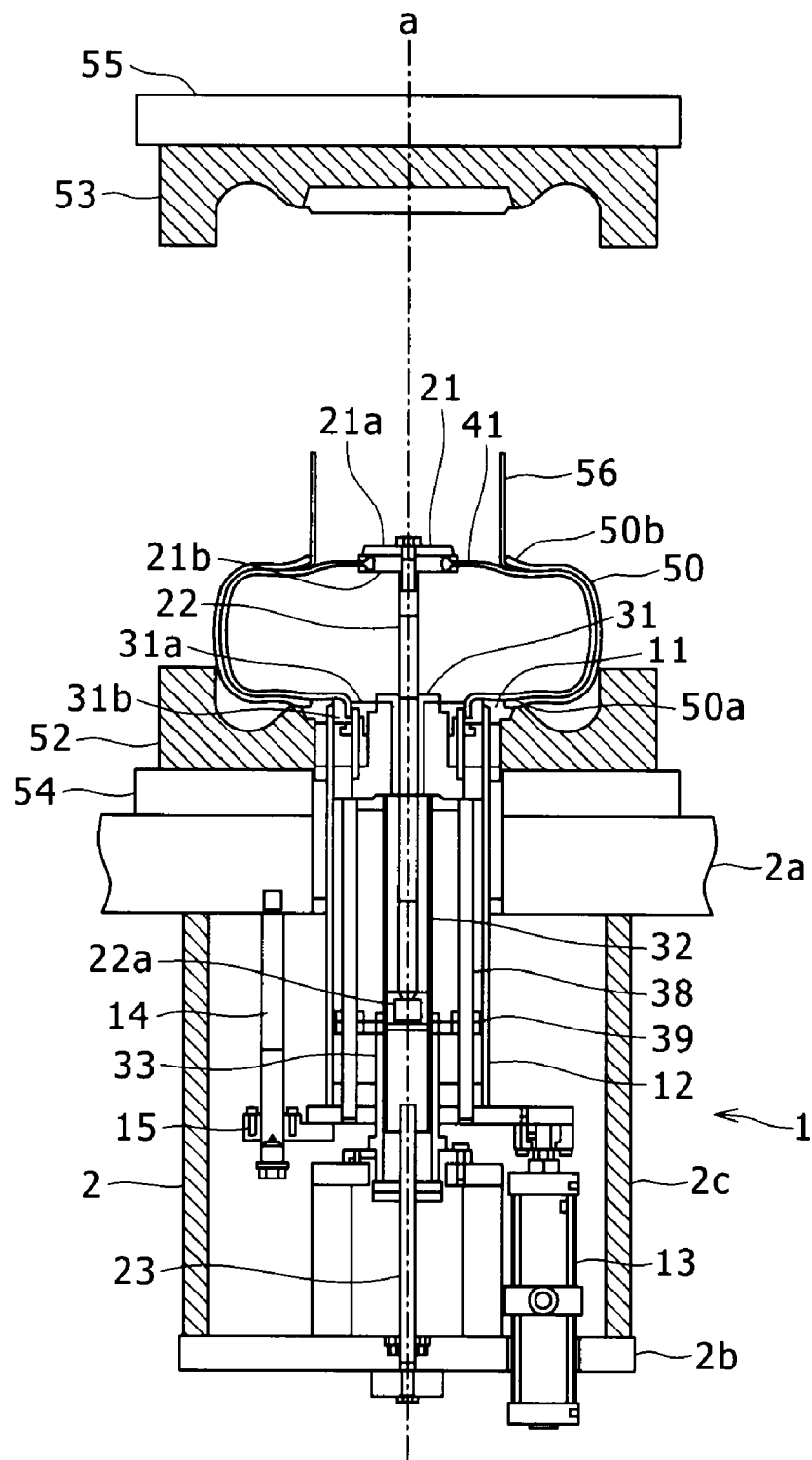
FIG. 1 is a sectional view showing a center mechanism of a tire vulcanizer during shaping a green tire.
Figure 2:
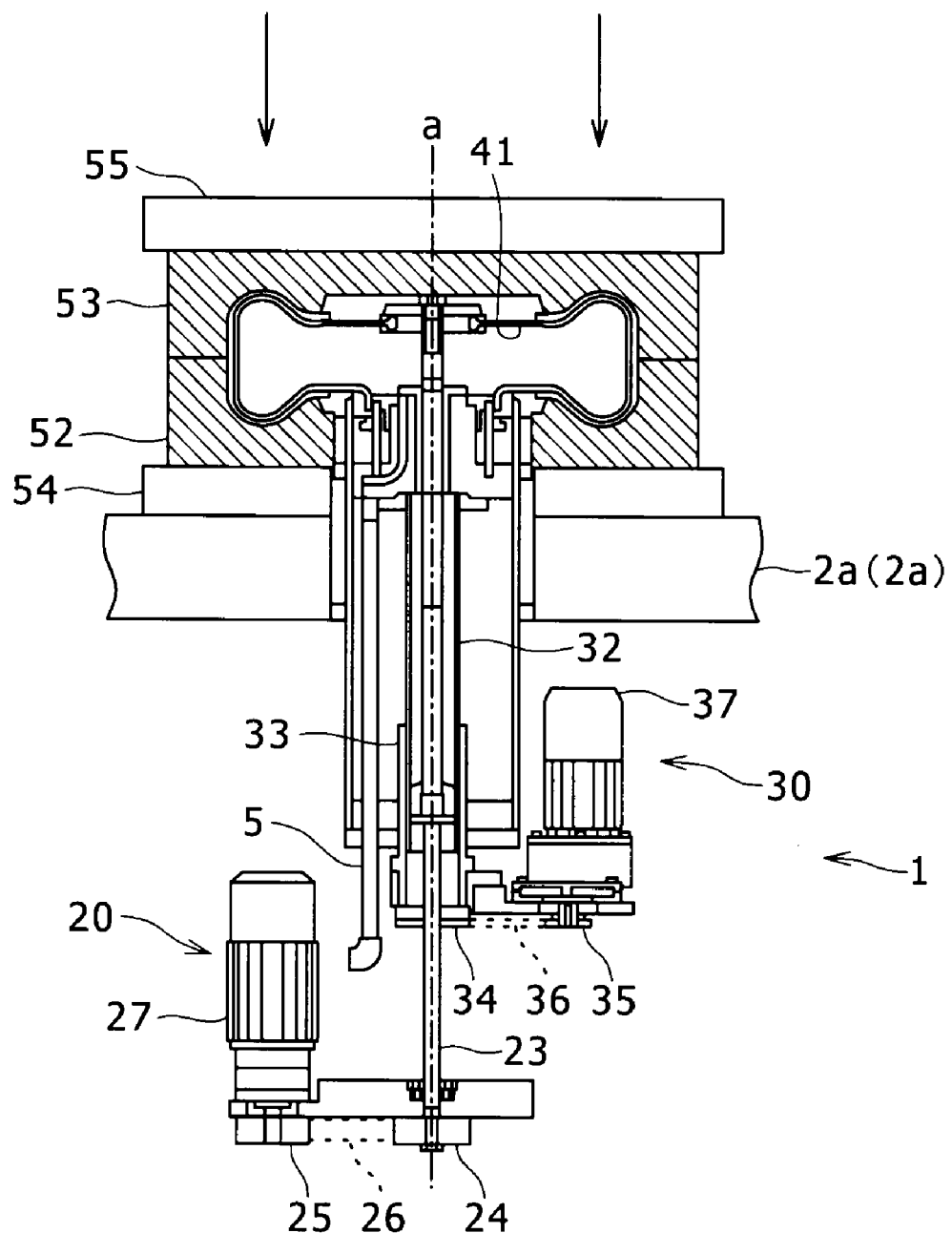
FIG. 2 is a sectional view showing the center mechanism of the tire vulcanizer during vulcanizing.
Figure 3:
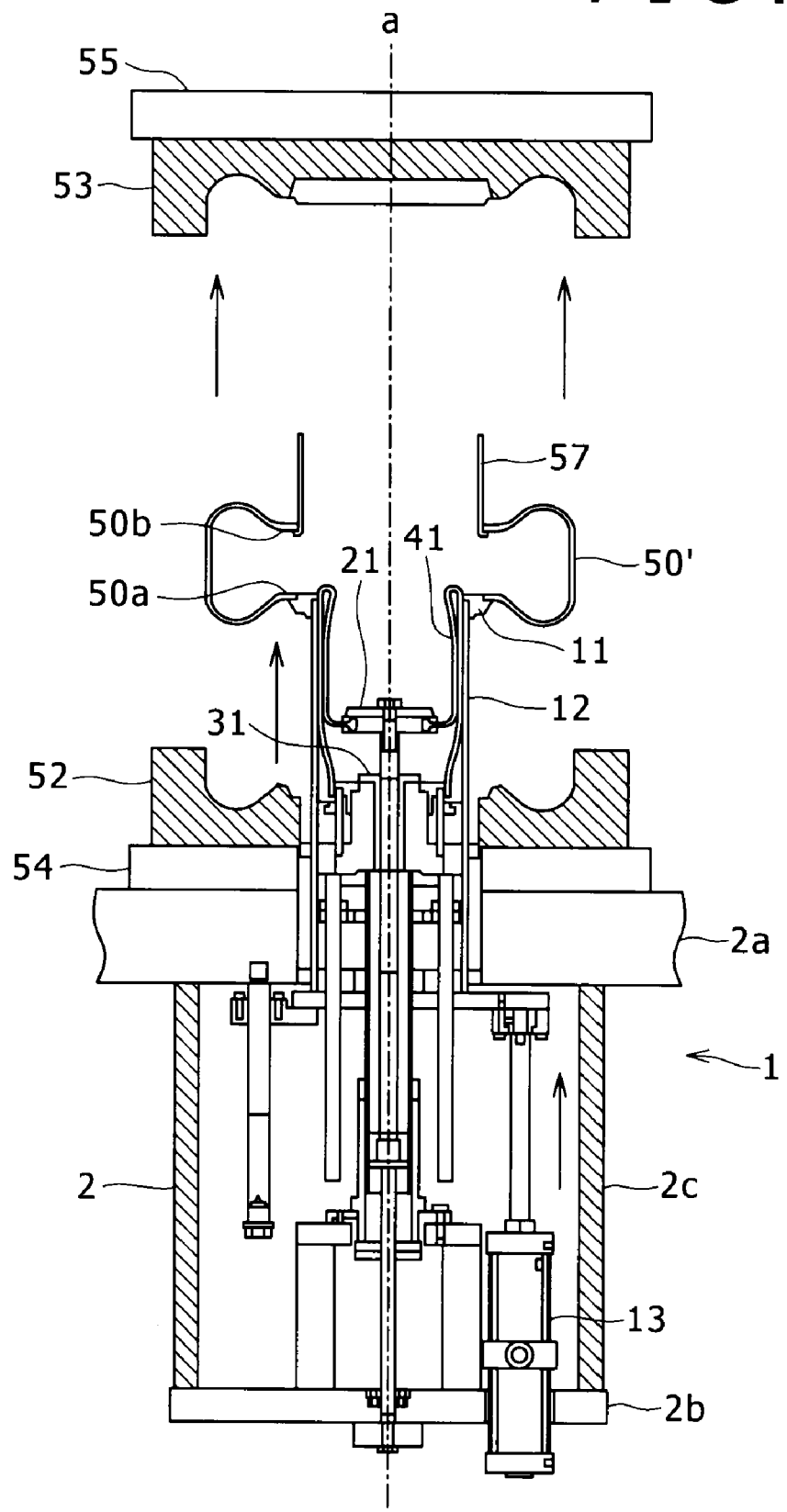
FIG. 3 is a sectional view showing the center mechanism of the tire vulcanizer during unloading the vulcanized tire.

A center mechanism 1 of a tire vulcanizer (hereinafter, the center mechanism) according to the present embodiment is arranged under a center of a lower mold 52 including a hole in the center thereof, as shown in FIGS. 1 to 3. The center mechanism 1 has a flexible (rubber) bag-shaped bladder 41 for performing shaping or the like of a green tire 50, an upper clamp 21 for holding (clamping) an upper end portion of the bladder 41, a lower clamp 31 positioned under the upper clamp 21 and holding (clamping) a lower end portion of the bladder 41, and a lower bead ring 11 supporting from below a lower bead 50a of the green tire 50.

The lower mold 52 is replaceable and provided on an upper portion 2a of a base frame 2 of the tire vulcanizer through a lower platen 54 serving as a heating source. An upper mold 53 is replaceable and provided on an upper structure body (not shown) of the tire vulcanizer through an upper platen 55 serving as a heating source. The upper structure body upwardly and downwardly moves the upper mold 53 so that the upper mold 53, which is positioned above the lower mold 52, is openable and closeable relative to the lower mold 52.

The upper clamp 21 has a configuration in which the upper end portion of the bladder 41 is pressed between a upper ring 21a, which is the upper side of the upper clamp 21, and a upper clamp ring 21b, which is the lower side thereof, and the upper end portion is clamped by fastening the rings 21a and 21b with a bolt. The lower clamp 31 has a configuration in which the lower end portion of the bladder 41 is held between a lower ring 31a, which is the inner side of the lower clamp 31, and a lower clamp ring 31b, which is the outer side thereof, and the lower end portion is clamped by fitting the lower ring 31a into the lower clamp ring 31b. By upwardly and downwardly moving the lower clamp ring 31b relative to the lower ring 31a with a cylinder (not shown), the bladder 41 can be detached or attached (replacement of the bladder 41).

The center mechanism 1 also has a lower clamp lifting/lowering mechanism 30 that upwardly and downwardly moves the lower clamp 31. The lower clamp lifting/lowering mechanism 30 has a cylindrical member (a cylinder member) 32 having a male screw on the outer circumference thereof and supporting the lower clamp 31 from below, an adjustment nut 33 to be screwed onto the male screw of the cylindrical member 32, and a sensor-equipped electric motor (a motor) 37 fixed to the base frame 2 and rotating the adjustment nut 33.

The cylindrical member 32 is provided within a bladder well 12 described later, and the lower clamp 31 is attached to an upper end of the cylindrical member 32. A female screw to be screwed onto the male screw of the cylindrical member 32 is formed on the inner circumference of the adjustment nut 33. A sprocket 34 is connected to the lower end of this adjustment nut 33. A roller chain 36 is looped over this sprocket 34 and a sprocket 35 driven by the sensor-equipped electric motor 37.

The sensor-equipped electric motor 37 is arranged lateral to the adjustment nut 33, and attached to a side portion 2c of the base frame 2 with the sprocket 35 positioned under the sensor-equipped electric motor 37. The sensor-equipped electric motor 37 rotates the sprocket 35 to rotate the adjustment nut 33 through the roller chain 36 and the sprocket 34. Here, the lower clamp 31 is prevented from rotating relative to the bladder well 12 by a guide rod 38 attached to the lower clamp 31 and a guide 39 attached on the inner side of the bladder well 12. Thus, when the sensor-equipped electric motor 37 rotates the adjustment nut 33, the cylindrical member 32 is upwardly or downwardly moved, and as a result, the lower clamp 31 is upwardly or downwardly moved. In this way, by arranging the sensor-equipped electric motor 37 lateral to the adjustment nut 33, the length of the tire vulcanizer below the lower mold 52 can be vertically shortened.

The sensor-equipped electric motor 37 can output electric signal in accordance with height of the lower clamp 31 with its sensor. A control device (not shown) for controlling the entire system controls drive of the electric motor based on the output from the sensor, and controls an attached brake so that the lower clamp 31 can be stopped at a desired height position. It should be noted that the electric motor and the sensor may be separate bodies.

The center mechanism 1 also has an upper clamp lifting/lowering mechanism 20 that upwardly and downwardly moves the upper clamp 21. The upper clamp lifting/lowering mechanism 20 has a hollow rod 22, to the lower end of which a nut member 22a having a female screw on the inner circumference thereof is attached, the rod 22 supporting the upper clamp 21 from below, a screw shaft 23 arranged within the rod 22 and screwed into the female screw of the nut member 22a, and a sensor-equipped electric motor (a motor) 27 fixed to the base frame 2 and rotating the screw shaft 23.

The rod 22 is provided inside the cylindrical member 32, extends along a center line "a" of the lower mold 52 and slidably penetrates the lower clamp 31. The upper clamp 21 is connected to the upper end of the rod 22 by a bolt. A male screw to be screwed into the female screw of the nut member 22a attached to the lower end portion of the rod 22 is formed on the outer circumference of the screw shaft 23. The lower portion of this screw shaft 23 is rotatably supported on a bearing. A pulley 24 is connected to the lower end of the screw shaft 23. A timing belt 26 is looped over this pulley 24 and a pulley 25 driven by the sensor-equipped electric motor 27.

The sensor-equipped electric motor 27 is arranged lateral to the screw shaft 23, and attached to the side portion 2c of the base frame 2 with the pulley 25 positioned under the sensor-equipped electric motor 27. The sensor-equipped electric motor 27 rotates the pulley 25 to rotate the screw shaft 23 through the timing belt 26 and the pulley 24. Here, the lower clamp 31 is prevented from rotating relative to the bladder well 12. The bladder well 12 is prevented from rotating relative to the base frame 2 by a guide 15 and a guide rod 14 attached to the bladder well 12. The rod 22, to which the upper clamp 21 is attached, is prevented from rotating relative to the cylindrical member 32 attached to the lower clamp 31. Thus, when the sensor-equipped electric motor 27 rotates the screw shaft 23, the rod 22 is upwardly or downwardly moved, and as a result, the upper clamp 21 is upwardly or downwardly moved. In this way, by arranging the sensor-equipped electric motor 27 lateral to the screw shaft 23, the length of the tire vulcanizer below the lower mold 52 can be vertically shortened.

The sensor-equipped electric motor 27 can output electric signal in accordance with height of the upper clamp 21 by its sensor. The control device (not shown) for controlling the entire system controls drive of the electric motor based on the output from the sensor, and controls an attached brake so that the upper clamp 21 can be stopped at a desired height position. It should be noted that the electric motor and the sensor may be separate bodies.

The center mechanism 1 also has the bladder well 12 that is provided around the cylindrical member 32 with the upper end of the bladder well 12 being connected to the lower bead ring 11, and that is capable of placing the upper clamp 21, the lower clamp 31, and the bladder 41, and pneumatic cylinders (bladder well lifting/lowering mechanisms) 13 that upwardly and downwardly moves the bladder well 12. It should be noted that, although only one pneumatic cylinder is shown in FIGS. 1 and 3, two pneumatic cylinders are provided in the present embodiment.

The lower bead ring 11 is fixed to the upper end of the bladder well 12, and rods of the pneumatic cylinders 13 are fixed to the lower end thereof. The pneumatic cylinders 13 are fixed to a lower portion 2b of the base frame 2. Drive of the pneumatic cylinders 13 is controlled by the control device for controlling the entire system. The pneumatic cylinders 13 upwardly and downwardly move the bladder well 12 within a range between a bottom position where the lower bead ring 11 is positioned on the lower mold 52 and the bladder 41 is installed in the green tire 50 (refer to FIG. 1) and a top position where the lower bead ring 11 is positioned above the lower mold 52 and the upper clamp 21 and the upper clamp 21, the lower clamp 31, and the bladder 41 are placed in the bladder well 12 (refer to FIG. 3). When the bladder well 12 is positioned at the top position, a vulcanized and patterned tire 50' is unloaded from the lower mold 52, and the bladder 41 is placed in the bladder well 12. In this way, by using the pneumatic cylinders 13, a maintenance property regarding leakage can be improved relative to a hydraulic cylinder.

As partially shown in FIG. 1, a vertical loader 56 holds an upper bead 50b of the green tire 50 and loads the green tire 50 onto the lower bead ring 11. Thereby, a lower bead 50a of the green tire 50 is supported by the lower bead ring 11 from below. In addition, as partially shown in FIG. 3, an unloader 57 holds the upper bead 50b of the vulcanized tire 50' and unloads the vulcanized tire 50' from the lower bead ring 11.

As shown in FIG. 2, a supply tube 5 for supplying heat medium into the bladder 41 is connected to the lower clamp 31. A discharge tube (not shown) for discharging the heat medium out from the bladder 41 is also connected to the lower clamp 31.

(Operation of Center Mechanism of Tire Vulcanizer)

Next, operations of the center mechanism 1 of the tire vulcanizer will be described.

(Normal Operation)

First of all, vulcanization and patterning operations will be described. Firstly, the lower bead ring 11 is positioned above the lower mold 52 and the upper clamp 21 by positioning the bladder well 12 at the top position, and the upper clamp 21 is lowered so as to be brought into contact with the lower clamp 31. Thus, the bladder 41 is placed inside the bladder well 12. Then, the vertical loader 56 holding the upper bead 50b of the green tire 50 loads the green tire 50 above the lower mold 52, and puts the green tire 50 on the lower bead ring 11. Thereafter, the green tire 50 held by the vertical loader 56 and the bladder well 12 are lowered at the same time, so that the bladder well 12 is positioned at the bottom position. Thus, the lower bead ring 11 is positioned on the lower mold 52.

Next, pressure medium having low pressure is introduced from the supply tube (not shown) into the bladder 41. If the upper clamp 21 has been lowered, the upper clamp 21 is lifted by the upper clamp lifting/lowering mechanism 20 at the same time as this introduction of the pressure medium. Thereby, the bladder 41 is closely contacted with an inner circumferential surface of the green tire 50, and shaping is performed as shown in FIG. 1.

Thereafter, the vertical loader 56 is retreated from the lower mold 52. Next, as shown in FIG. 2, the upper mold 53 attached to the upper platen 55 is lowered, so that squeezing force is generated between the upper mold 53 and the lower mold 52 attached to the lower platen 54. Further, heat medium having high temperature and high pressure is supplied into the bladder 41 from the supply tube 5, and vulcanization is started. When the vulcanization is started, downward force due to vulcanization internal pressure acts on the lower clamp 31. However, this force is received by the base frame 2 through the adjustment nut 33 whose rotation is stopped. Thereby, the lower clamp 31 can be prevented from being pushed down. Thus, a positional relationship between the lower clamp 31 and the lower bead ring 11 is maintained.

It should be noted that there is a need for adjusting the height of the lower clamp 31 during the vulcanization in accordance with a shape of the lower mold 52. The height of the lower clamp 31 is adjusted by the lower clamp lifting/lowering mechanism 30.

After completing the vulcanization, the heating medium inside bladder is discharged and the upper mold 53 is lifted, as shown in FIG. 3, so that the upper mold 53 and the lower mold 52 are opened. Thereby, the vulcanized tire 50' is unloaded from the upper mold 53. Thereafter, while the heights of the upper clamp 21 and the lower clamp 31 are fixed (while their positions are maintained), the bladder well 12 is lifted from the bottom position to the top position, and thereby the lower bead ring 11 is positioned above the lower mold 52 and the upper clamp 21. Thereby, the vulcanized tire 50' with the lower bead 50a being supported by the lower bead ring 11 is lifted. Thus, the vulcanized tire 50' is unloaded from the lower mold 52 and at the same time, the bladder 41 is taken away from the inner circumferential surface of the vulcanized tire 50' and is placed inside the bladder well 12. By placing the bladder 41 in the bladder well 12, the remaining heat medium inside the bladder 41 is discharged from the discharge tube.

In this way, the unloading of the vulcanized tire 50' from the lower mold 52 and the taking of the bladder 41 away from the inner circumferential surface of the vulcanized tire 50' can be performed by one operation of lifting the bladder well 12 from the bottom position to the top position. Thus, working efficiency can be improved. In addition, when the bladder 41 is placed in the bladder well 12, there is no need for lowering the heights of the upper clamp 21 and the lower clamp 31. Thus, a lowering amount of the upper clamp 21 and the lower clamp 31 can be suppressed, and hence the total height of the tire vulcanizer can be lowered.

Thereafter, the unloader 57 is moved between the upper mold 53 and the lower mold 52, and the vulcanized tire 50' is unloaded. By repeating the above cycle, the green tires 50 of the same type are vulcanized and patterned.

It should be noted that, when the vulcanized tire 50' is unloaded from the lower mold 52, there is a fear that the lower bead 50a is removed from the lower bead ring 11. Then, in order to stabilize the operation, the upper clamp 21 may be slightly lowered immediately after completing the vulcanization, so that the unloader 57 can hold the upper bead 50b of the vulcanized tire 50'. After the upper bead 50b of the vulcanized tire 50' is held by the unloader 57, the unloader 57 and the bladder well 12 may be simultaneously lifted to perform both the unloading of the vulcanized tire 50' from the lower mold 52 and the placing of the bladder 41 in the bladder well 12.

(Bladder Replacement)

Next, operations at the time of replacing the bladder 41 will be described. The bladder 41 used in the center mechanism 1 has to be replaced about once a few days due to deterioration. When the bladder 41 is replaced, the exposure of the lower end portion of the bladder 41, that is, the lower clamp 31 from the bladder well 12 facilitates the replacement task. That is, when the lower clamp 31 is positioned above the position shown in FIG. 1, the bladder 41 is more easily replaced. Then, the upper clamp 21 is upwardly moved by the upper clamp lifting/lowering mechanism 20, and the lower clamp 31 is upwardly moved to above the lower bead ring 11 by the lower clamp lifting/lowering mechanism 30.

Then, by lowering the lower clamp ring 31b of the lower clamp 31 relative to the lower ring 31a thereof, the clamping of the lower end portion of the bladder 41 is released. In addition, by loosening the bolt fastening the upper ring 21a and the upper clamp ring 21b of the upper clamp 21, the clamping of the upper end portion of the bladder 41 is released. Then, the old bladder 41 is removed, and an upper end portion and a lower end portion of a new bladder 41 are respectively held by the upper clamp 21 and the lower clamp 31. In this way, when the bladder 41 is replaced, the replacement task of the bladder 41 can be readily performed by moving the lower clamp 31 to above the lower bead ring 11.

Thereafter, the lower clamp 31 is moved to below the lower bead ring 11 by the lower clamp lifting/lowering mechanism 30, and the upper clamp 21 is downwardly moved by the upper clamp lifting/lowering mechanism 20. Then, the operation is shifted to the normal vulcanization and patterning operation.

(Effects)

As described above, according to the center mechanism 1 of the tire vulcanizer of the present embodiment, after the green tire 50 is vulcanized and patterned, the bladder well 12 is lifted from the bottom position to the top position while the heights of the upper clamp 21 and the lower clamp 31 are fixed. Thereby, the vulcanized tire 50' with the lower bead 50a being supported by the lower bead ring 11 is lifted. Thus, the vulcanized tire 50' is unloaded from the lower mold 52 and at the same time, the bladder 41 is placed in the bladder well 12. In this way, the unloading of the vulcanized tire 50' from the lower mold 52 and the taking of the bladder 41 away from the inner circumferential surface of the vulcanized tire 50' can be performed by one operation. Thus, the working efficiency can be improved. In addition, when the bladder 41 is placed in the bladder well 12, there is no need for lowering the heights of the upper clamp 21 and the lower clamp 31. Thus, the moving amounts of the upper clamp 21 and the lower clamp 31 can be suppressed, and hence the total height of the tire vulcanizer can be lowered.

Further, when the vulcanization and patterning are started, the downward force due to the vulcanization internal pressure acts on the lower clamp 31. However, this force is received by the base frame 2 through the adjustment nut 33. Thereby, the lower clamp 31 can be prevented from being pushed down. Furthermore, unlike conventional cylinders that are vertically arranged, the electric motor can be arranged lateral to the adjustment nut 33. Thus, in comparison to a case where the cylinders are used, the length of the tire vulcanizer under the lower mold 52 can be vertically shortened.

Furthermore, unlike the conventional cylinders that are vertically arranged, the electric motor can be arranged lateral to the screw shaft 23. Thus, in comparison to a case where the cylinders are used, the length of the tire vulcanizer under the lower mold 52 can be vertically shortened.

Furthermore, by using the pneumatic cylinders 13, the maintenance property regarding the leakage can be improved in comparison to the hydraulic cylinder.

MODIFIED EXAMPLE OF THE PRESENT EMBODIMENT

Although the embodiment of the present invention has been described above, the embodiment does not particularly limit the present invention but only shows a specific example. Designs of specific structures and the like can be properly changed. In addition, the operations and effects described in the embodiment of the invention are only a list of the most favorable operations and effects generated from the present invention. Operations and effects of the present invention are not limited to those described in the embodiment of the present invention.

What is claimed is:

1. A center mechanism of a tire vulcanizer, in which a green tire is vulcanized and patterned in such a manner that a bladder is installed in the green tire, and then the green tire is squeezed between a lower mold provided on a base frame and a upper mold, which is positioned above the lower mold and openable and closable relative to the lower mold, the center mechanism comprising:

an upper clamp for holding an upper end portion of the bladder;

a lower clamp positioned under said upper clamp, said lower clamp for holding a lower end portion of the bladder;

a lower bead ring supporting a lower bead of the green tire from below;

an upper clamp lifting/lowering mechanism for upwardly and downwardly moving said upper clamp;

a lower clamp lifting/lowering mechanism for upwardly and downwardly moving said lower clamp;

a bladder well with an upper end thereof being connected to said lower bead ring, said bladder well being capable of placing said upper clamp, said lower clamp, and the bladder inside thereof; and a bladder well lifting/lowering mechanism for upwardly and downwardly moving said bladder well within a range between a bottom position where said lower bead ring is positioned on the lower mold and the bladder is installed in the green tire and a top position where said lower bead ring is positioned above the lower mold and said upper clamp, and said upper clamp, said lower clamp, and the bladder are placed in said bladder well, wherein after the green tire is vulcanized and patterned, said bladder well lifting/lowering mechanism lifts said bladder well from the bottom position to the top position while heights of said upper clamp and said lower clamp are fixed, wherein said lower clamp lifting/lowering mechanism has a cylinder member including a male screw on an outer circumference thereof, and supporting said lower clamp from below, an adjustment nut to be screwed onto said male screw of said cylinder member, and a motor fixed to the base frame, said motor for rotating said adjustment nut.

2. The center mechanism of a tire vulcanizer according to claim 1, wherein said upper clamp lifting/lowering mechanism has a hollow rod including a female screw on an inner circumference thereof, and supporting said upper clamp from below, a screw shaft arranged within said rod to be screwed into said female screw, and a motor fixed to the base frame, said motor for rotating said screw shaft.

3. The center mechanism of a tire vulcanizer according to claim 1, wherein said bladder well lifting/lowering mechanism is a pneumatic cylinder.

* * * * *